United States Patent
Zhang et al.

(10) Patent No.: US 10,775,350 B2
(45) Date of Patent: Sep. 15, 2020

(54) APPARATUS AND METHOD FOR MONITORING OF WELDING JOINTS WITH IN-SITU SENSORS

(71) Applicant: Jiaxing Broadsens Technology, Ltd., Jiaxing (CN)

(72) Inventors: Chang Zhang, San Jose, CA (US); Lei Liu, San Ramon, CA (US)

(*) Notice: Subject to any disclaimer, the term of this patent is extended or adjusted under 35 U.S.C. 154(b) by 16 days.

(21) Appl. No.: 16/275,338

(22) Filed: Feb. 14, 2019

(65) Prior Publication Data

US 2020/0072793 A1     Mar. 5, 2020

(30) Foreign Application Priority Data

Aug. 30, 2018  (CN) .......................... 2018 1 1005844

(51) Int. Cl.
*G01N 29/32*     (2006.01)
*G01N 29/07*     (2006.01)

(52) U.S. Cl.
CPC .......... *G01N 29/07* (2013.01); *G01N 29/326* (2013.01); *G01N 2291/0289* (2013.01); *G01N 2291/103* (2013.01); *G01N 2291/267* (2013.01)

(58) Field of Classification Search
CPC .................. G01N 29/07; G01N 29/326; G01N 2291/0289; G01N 2291/267; G01N 2291/103
USPC ......................................................... 73/588
See application file for complete search history.

(56) References Cited

U.S. PATENT DOCUMENTS

| | | | | |
|---|---|---|---|---|
| 5,359,895 A | * | 11/1994 | Isenberg | G01N 29/11 73/52 |
| 2003/0154791 A1 | * | 8/2003 | Wagner | G01N 29/043 73/596 |
| 2004/0045358 A1 | * | 3/2004 | Wagner | G01N 29/2493 73/588 |
| 2004/0187596 A1 | * | 9/2004 | Ichikawa | G01N 3/08 73/850 |
| 2005/0126294 A1 | * | 6/2005 | Bossi | G01N 29/221 73/629 |
| 2009/0114021 A1 | * | 5/2009 | den Boer | B29C 66/73921 73/596 |

(Continued)

FOREIGN PATENT DOCUMENTS

CN     103171147     *  6/2013
WO   WO2012048199   *  4/2012

*Primary Examiner* — Jacques M Saint Surin
(74) *Attorney, Agent, or Firm* — Jigang Jin

(57) ABSTRACT

The present invention discloses an apparatus and method for scheduled, real-time, or on-demand monitoring of welding joints with in-situ sensors. The apparatus includes at least one ultrasonic actuator, at least one ultrasonic receiver, a control unit, and a signal processing unit. The control unit controls the ultrasonic actuators and the ultrasonic receivers. The signal processing unit determines the status of the welding joint based on the ultrasonic signals reflected from or transmitted through the welding joint. The invention enables monitoring of the status of the welding joint, tracking of the occurrence and expansion of the welding defect, and determining the position and severity of the defect in real time while the equipment is in service. The invention can optimize the maintenance efficiency, change the periodical inspection to automatic and real-time monitoring, and effectively prevent disaster accidents.

17 Claims, 4 Drawing Sheets

(56) References Cited

U.S. PATENT DOCUMENTS

| | | | | |
|---|---|---|---|---|
| 2011/0088903 A1* | 4/2011 | Onadeko | ............... | E21B 31/00 |
| | | | | 166/301 |
| 2013/0277344 A1* | 10/2013 | Guymon | ............. | B23K 9/0953 |
| | | | | 219/125.1 |
| 2015/0253288 A1* | 9/2015 | Spencer | ................ | G01N 29/11 |
| | | | | 73/602 |
| 2017/0182605 A1* | 6/2017 | Rajagopalan | ........ | B23K 9/0282 |

* cited by examiner

APPARATUS AND METHOD FOR MONITORING OF WELDING JOINTS WITH IN-SITU SENSORS

CROSS-REFERENCE TO RELATED APPLICATION

This application claims priority to Chinese patent application Ser. No. 201811005844.X, filed on Aug. 30, 2018, the entire content of which is incorporated herein by reference.

FIELD OF INVENTION

The present invention generally relates to the field of welding technology and more particularly to an apparatus and method for online monitoring of welding joints.

BACKGROUND OF THE INVENTION

Welding is one of the most fundamental processes in the manufacturing industry and is widely used in many applications, such as trains, aircrafts, ships, power plants, chemical processing plants and many others. The quality control of welding joints has direct impacts on the safety of the structure and is an important part of structural quality management. When an equipment is in operation, the endurance of the welding joint is far lower than that of the base metal, and the welded structure may suffer from fatigue failure due to impacts such as dynamic loads. The formation and expansion of fatigue failure can be difficult to detect, and fatigue fracture typically occurs in a short time, causing great economic losses and catastrophic consequences.

Methods for inspection of welding joints include radiographic inspection, ultrasonic inspection, magnetic flaw inspection, and penetration inspection. Currently, these inspection methods of welding joints are performed manually. Many welding joints, such as those on train frames, are located in hard-to-reach areas and offline inspections often involves the cease of the operation and disassembly of surrounding structures. In other cases, the welding joints, such as those on offshore wind turbines, are located in remote areas, where remote inspections are desired. Therefore, it is desirable to have an automatic monitoring method of welding joints with in-situ sensors.

SUMMARY OF THE INVENTION

The objective of this invention is to propose an apparatus and method for scheduled, real-time, or on-demand monitoring of welding joints with in-situ sensors.

The present invention includes an apparatus for scheduled, real-time, or on-demand monitoring of welding joints with sensors mounted close to the joints. The apparatus comprises at least one ultrasonic actuator, at least one ultrasonic receiver, a control unit, and a signal processing unit. The actuators and the receivers are mounted on the same side of the welding joint; or the actuators are mounted on one side of the welding joint, and the receivers on the other side; or the actuators and the receivers are mounted in a mixed manner on both sides of the welding joint; the control unit is connected with the actuators and the receivers; the control unit is used to control the actuators to emit ultrasonic signals and/or to control the receivers to receive the signals; and the signal processing unit is used to determine the status of the welding joint based on the ultrasonic signals reflected from or transmitted through the welding joint.

In one embodiment of the invention, the actuators and the receivers are piezoelectric sensors. Piezoelectric sensors can covert electrical signals into mechanical vibrations, and/or conversely convert mechanical vibrations into electrical signals.

In another embodiment of the invention, the actuators and the receivers are electromagnetic acoustic transducers (EMAT). EMAT transducers allow non-contact monitoring of the joints when the joints area has high temperature.

In one embodiment of the invention, the actuators and the receivers are mounted on the same side of the welding joint. The actuators and the receivers are enclosed in one housing. The wires of the actuators and the receivers are enclosed in one cable and connected to the control unit or signal processing unit. In this arrangement, the enclosure can include multiple actuators and receivers.

In another embodiment of the invention, the actuators are mounted on one side of the welding joint and the receivers on the other side. The actuators are enclosed in one housing. Each receiver is enclosed in a separate housing. The wires of the actuators and the receivers are enclosed in the one cable and connected to the control unit. The wires of each receiver pass through the housing of the actuators.

In another embodiment of the invention, the actuators and the receivers are mounted in a mixed manner on both sides of the welding joint. The wires of the actuators and the receivers are enclosed in one cable and are connected to the control unit.

In one embodiment of the invention, the apparatus further includes a temperature sensor to monitor the temperature of the welding joint. The signal processing unit performs temperature compensation when determining the status of the welding joint.

In one embodiment of the invention, the apparatus further includes a strain sensor to monitor the strain of the welding joint. The signal processing unit uses the strain data to help determine the status of the welding joint.

In one embodiment of the invention, the welding joint can be any of the following types: butt joint, lap joint, T-joint, corner joint, crimp joint, cross joint, end joint, casing joint, diagonal butt joint, or lock butt joint.

The present invention also includes a method for scheduled, real-time, or on-demand monitoring of welding joints. The method comprises emitting ultrasonic signals, receiving ultrasonic signals reflected from or transmitted through the welding joint, and determining the status of the welding joint based on the ultrasonic signals reflected from or transmitted through the welding joint.

In one embodiment of the invention, the steps of emitting ultrasonic signals and receiving ultrasonic signals reflected from or transmitted through the welding joint include: calculating the propagation time of the ultrasonic signals based on the time between the signals are emitted and the time when the signals are received. The steps of determining the status of the welding joint based on the ultrasonic signals reflected from or transmitted through the welding joint include: determining the position of the welding defect based on the propagation time of the ultrasonic signals.

In one embodiment of the invention, the steps of calculating the propagation time of the ultrasonic signals based on the time when the signals are emitted and the time when the signals are received include: calculating the propagation time of the ultrasonic signals reflected from or transmitted through the welding joint from multiple actuators to one receiver based on the time when the signals are emitted from the actuators and the time when the signals are received by the receiver; or calculating the propagation time of the ultrasonic signals reflected from or transmitted through the welding joint from one actuator to multiple receivers based on the time when the signals are emitted from the actuator and received by the receivers.

The steps of determining the position of the welding defect based on the propagation time of the ultrasonic signals include: determining the position of the welding defect based on the time when the ultrasonic signals are reflected from or transmitted through the welding joint from multiple actuators to one receiver; or determining the position of the welding defect based on the time when the ultrasonic signals are reflected from or transmitted through the welding joint from one actuator to multiple receivers.

In one embodiment of the invention, the method further includes monitoring the temperature of the welding joint. The steps of determining the status of the welding joint based on the ultrasonic signals reflected from or transmitted through the welding joint include: using the temperature data of the welding joint to help determine the status of the welding joint.

In one embodiment of the invention, the method further includes monitoring the strain of the welding joint. The steps of determining the status of the welding joint based on the ultrasonic signals reflected from or transmitted through the welding joint include: using the strain data of the welding joint to help determine the status of the welding joint.

The invention has the following advantages: it enables monitoring of the status of the welding joint, tracking the occurrence and expansion of the welding defect, and determining the position and severity of the defect in real time while the equipment is in service. The invention can optimize the maintenance efficiency, change the periodical manual inspection to automatic scheduled and real-time and on-demand monitoring, and effectively prevent disaster accidents.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION

The following embodiments are meant to illustrate the invention but in no way to limit the scope of the invention.

The apparatus and method for scheduled, real-time, or on-demand monitoring of welding joints proposed by the invention employs in-situ ultrasonic technology. Ultrasonic actuators and receivers are mounted near the welding joint. The actuators emit ultrasonic signals to the structure. Ultrasonic signals propagate through the structure and reflected from or transmitted through the welding joint. The receivers receive the signals reflected from or transmitted through the welding joint. By processing the received signals, the status of the welding joint can be determined, and the position and severity of the welding defect can be found.

The apparatus and method for scheduled, real-time, or on-demand monitoring of welding joints provided by the invention is applicable to all joint types, including butt joint, lap joint, T joint, corner joint, crimp joint, cross joint, end joint, sleeve joint, inclined butt joint, lock bottom butt joint, and etc.

In one embodiment of the invention, the actuators and the receivers are piezoelectric sensors. Piezoelectric sensors can convert electrical signals into mechanical waves, and/or conversely convert mechanical vibrations into electrical signals.

In another embodiment of the invention, the actuators and the receivers are electromagnetic acoustic transducers (EMAT).

In the following description, butt joint is used as an example to illustrate the apparatus and method for scheduled, real-time, or on-demand monitoring of welding joints in the embodiments. Among them, embodiment 1, 2, and 3 describe the apparatus and method to determine the status of a welding joint using ultrasonic signals reflected from the welding joint, and embodiment 4 and 5 describe the apparatus and method to determine the status of a welding joint using ultrasonic signals transmitted through the welding joint.

In embodiment 1, the apparatus for scheduled, real-time, or on-demand monitoring of welding joints includes an ultrasonic actuator T, an ultrasonic receiver R, a signal processing unit, and a control unit. The signal processing unit can be a single chip microcomputer, and the control unit can be an FPGA, a DSP chip or a single chip microcomputer. The signal processing unit can also be integrated with the control unit on a single chip microcomputer or FPGA. The control unit may generate a schedule or on-demand command for monitoring welding joints.

Figure 1:
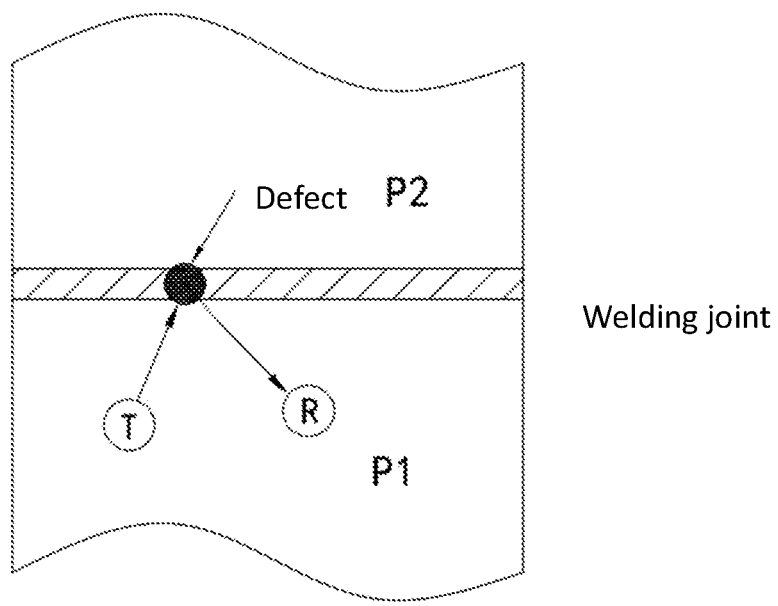
FIG. 1 is a schematic diagram of the working principle of an apparatus for scheduled, real-time, or on-demand monitoring of welding joints according to Embodiment 1 of the present invention.

In FIG. 1, T is an ultrasonic actuator, R is an ultrasonic receiver, and P1 and P2 are two structures welded together through a butt joint. Actuator T and receiver R are mounted on structure P1.

The following is the working principle of the apparatus for scheduled, real-time, or on-demand monitoring of welding joints provided by the embodiment. The control unit controls the actuator T to emit ultrasonic signals. Some ultrasonic signals are reflected from the welding joint. The reflected ultrasonic signals are received by the receiver R. The received signals when the welding joint is defective are different from those when the welding joint is normal. The signal processing unit determines if the welding joint is defective by analyzing the received signals.

There are many methods to determine if a welding joint is defective. One method uses comparison with baseline signals. Specifically, the received signal when the welding joint is normal is used as the baseline signal. When the welding joint is defective, the received signal deviates from the baseline signal. If the deviation reaches certain threshold, the welding joint is considered defective. Otherwise, the welding joint is considered normal.

The apparatus for scheduled, real-time, or on-demand monitoring of welding joints provided by this embodiment may further include a temperature sensor. At different temperatures, the received signals can be different. In order to compensate for the differences caused by the temperature, a temperature sensor is used to collect the temperature data of the structure at the welding joint in real time. When analyzing the received signals, the signal processing unit performs temperature compensation based on the temperature data of the welding joint, to compensate for the differences caused by the temperature.

The apparatus for scheduled, real-time, or on-demand monitoring of welding joints provided by this embodiment may further include a strain sensor. The strain sensor is used to collect the strain data of the welding joint. The signal processing unit uses the strain data to help determine the status of the welding joint and improve the accuracy of the determination.

In embodiment 2, the apparatus for scheduled, real-time, or on-demand monitoring of welding joints includes an actuator T, a first receiver R1, a second receiver R2, a signal processing unit and a control unit. The signal processing unit can be a single chip microcomputer. The control unit can be an FPGA, a DSP chip or a single chip microcomputer. The signal processing unit can also be integrated with the control unit on a single chip microcomputer or FPGA.

Figure 2:
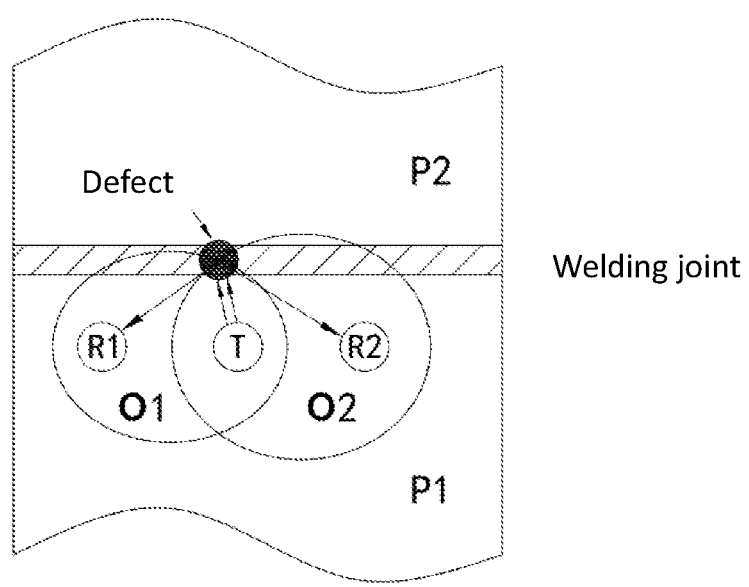
FIG. 2 is a schematic diagram of the working principle of an apparatus for scheduled, real-time, or on-demand monitoring of welding joints according to Embodiment 2 of the present invention.

In FIG. 2, T is an ultrasonic actuator, R1 is a first ultrasonic receiver, R2 is a second ultrasonic receiver, and P1 and P2 are two structures welded together through a butt joint. Actuator T, receiver R1, and receiver R2 are mounted on structure P1.

The following is the working principle of the apparatus for scheduled, real-time, or on-demand monitoring of welding joints provided by the embodiment. The control unit controls actuator T to emit ultrasonic signals. Some ultrasonic signals are reflected from the welding joint. The reflected signals are received by receiver R1 and R2. The received signals when the welding joint is defective are different from those when the welding joint is normal. The signal processing unit determine if the welding joint is defective by analyzing the received signals.

There are many methods to determine if a welding joint is defective. One method uses comparison with baseline signals. Specifically, the received signal when the welding joint is normal is used as the baseline signal. When the welding joint is defective, the received signal deviates from the baseline signal. The difference between the received signal and the baseline signal is considered to be caused by the defect and treated as the reflected signal from the defect. If the deviation reaches certain threshold, the welding joint is considered defective. Otherwise, the welding joint is considered normal.

In this embodiment, the position of the defect can be determined. The time that the signal reflected from the defect reaches R1 and the time that the signal reflected from the defect reaches R2 can be used to determine the position of the defect. Assume that the time that the signal reaches R1 is t1, and the propagation velocity of the ultrasonic wave in structure P1 is v. Ignoring the transmission time of the ultrasonic wave inside the joint, the total distance of the ultrasonic wave travels from T to the defect and reflects back to R1 is t1*v. The set of points with sum of distances to T (the position of actuator T) and R1 (the position of receiver R1) equal to t1*v form an ellipse O1 with foci T and R1. Ellipse O1 and the joint line have at most two intersections and either may be the position of the defect. The position of the defect cannot be uniquely determined. If a second receiver R2 is added, the two intersections of ellipse O2 and the joint line can be found similarly. The position of the defect can be uniquely identified by selecting one point from each of the two intersections, where the distance between the two selected points are the shortest. The midpoint of the two selected points can be considered the position of the defect.

The severity of the defect can be determined using the energy of the received signals or using other methods. For example, it can be determined based on the assumption that the larger the defect is, the greater the energy of the reflected signals from the defect. Or it can be determined based on the assumption that the energy difference between the received signals when the welding joint is defective and those when the welding joint is normal is proportional to the size of the defect.

The apparatus for scheduled, real-time, or on-demand monitoring of welding joints provided by this embodiment may further include a temperature sensor. At different temperatures, the received signals can be different. In order to compensate for the differences caused by the temperature, a temperature sensor is used to collect the temperature data of the structure at the welding joint in real time. When analyzing the received signals, the signal processing unit performs temperature compensation based on the temperature data of the welding joint, to compensate for the differences caused by the temperature.

The apparatus for scheduled, real-time, or on-demand monitoring of welding joints provided by this embodiment may further include a strain sensor. The strain sensor is used to collect the strain data of the welding joint. The signal processing unit uses the strain data to help determine the status of the welding joint and improve the accuracy of the determination.

In embodiment 3, the apparatus for scheduled, real-time, or on-demand monitoring of welding joints includes a first ultrasonic actuator T1, a second ultrasonic actuator T2, an ultrasonic receiver R, a signal processing unit and a control unit. The signal processing unit can be a single chip microcomputer. The control unit can be an FPGA, a DSP chip or a single chip microcomputer. The signal processing unit can also be integrated with the control unit on a single chip microcomputer or FPGA.

Figure 3:
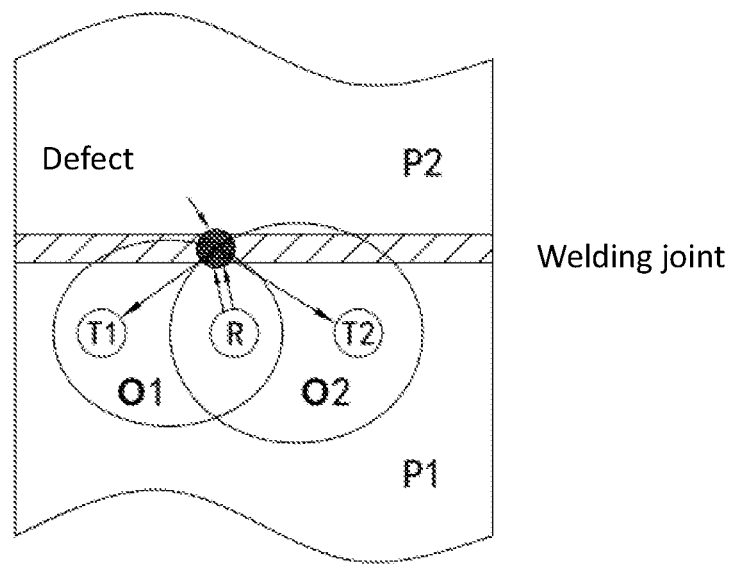
FIG. 3 is a schematic diagram of the working principle of an apparatus for scheduled, real-time, or on-demand monitoring of welding joints according to Embodiment 3 of the present invention.

In FIG. 3, T1 is a first ultrasonic actuator, T2 is a second ultrasonic actuator, R is an ultrasonic receiver, and P1 and P2 are two structures welded together through a butt joint. Actuator T1, actuator T2, and receiver R are mounted on structure P1.

The following is the working principle of the apparatus for scheduled, real-time, or on-demand monitoring of welding joints provided by this embodiment. The control unit controls actuator T1 and actuator T2 to emit ultrasonic signals. Some ultrasonic signals are reflected from the welding joint. The reflected signals are received by receiver R. The received signals when the welding joint is defective is different from those when the welding joint is normal. The signal processing unit determines if the welding joint is defective by analyzing the received signals.

There are many methods to determine if a welding joint is defective. One method uses comparison with baseline signals. Specifically, the received signal when the welding joint is normal is used as the baseline signal. When the welding joint is defective, the received signal deviates from the baseline signal. The difference between the received signal and the baseline signal is considered to be caused by the defect and treated as the reflected signal from the defect. If the deviation reaches certain threshold, the welding joint is considered defective. Otherwise, the welding joint is considered normal.

In this embodiment, the position of the defect can be determined. The time that the signal emitted from T1 and reflected from the defect reaches R and the time that the signal emitted from T2 and reflected from the defect reaches R can be used to determine the position of the defect. Assume that the time that the signal emitted from T1 reaches R is t1, and the propagation velocity of the ultrasonic wave in structure P1 is v. Ignoring the transmission time of the ultrasonic wave inside the joint, the total distance of the ultrasonic wave travels from T1 to the defect and reflects back to R is t1*v. The set of points with sum of distances to T1 (the position of actuator T1) and R (the position of receiver R) equal to t1*v form an ellipse O1 with foci T1 and R. Ellipse O1 and the joint line have at most two intersections and either may be the position of the defect. The position of the defect cannot be uniquely determined. If a second actuator T2 is added, the two intersections of ellipse O2 and the joint line can be found similarly. The position of the defect can be uniquely identified by selecting one point from each of the two intersections, where the distance between the two selected points are the shortest. The midpoint of the two selected points can be considered the position of the defect.

The severity of the defect can be determined using the energy of the reflected signals from the defect or using other methods. For example, it can be determined based on the assumption that the larger the defect is, the greater the energy of the reflected signals from the defect. Or it can be determined based on the assumption that the energy difference between the received signals when the welding joint is defective and those when the welding joint is normal is proportional to the size of the defect.

The apparatus for scheduled, real-time, or on-demand monitoring of welding joints provided by this embodiment may further include a temperature sensor. At different temperatures, the received signals can be different. In order to compensate for the differences caused by the temperature, a temperature sensor is used to collect the temperature data of the structure at the welding joint in real time. When analyzing the received signal, the signal processing unit performs temperature compensation based on the temperature data of the welding joint, to compensate for the differences caused by the temperature.

The apparatus for scheduled, real-time, or on-demand monitoring of welding joints provided by this embodiment may further include a strain sensor. The strain sensor is used to collect the strain data of the welding joint. The signal processing unit uses the strain data to help determine the status of the welding joint and improve the accuracy of the determination.

In embodiment 4, the apparatus for scheduled, real-time, or on-demand monitoring of welding joints includes an ultrasonic actuator T, an ultrasonic receiver R, a signal processing unit, and a control unit. The signal processing unit can be a single chip microcomputer. The control unit can be an FPGA, a DSP chip or a single chip microcomputer. The signal processing unit can also be integrated with the control unit on a single chip microcomputer or FPGA.

Figure 4:
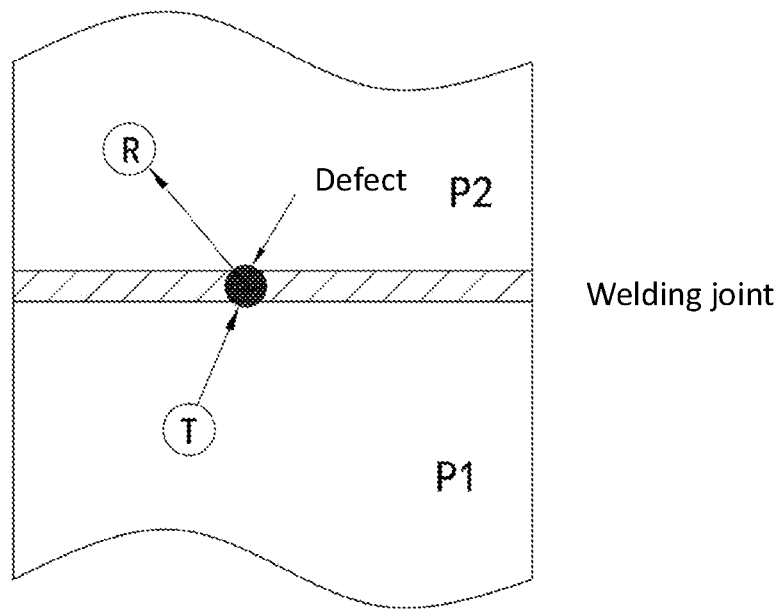
FIG. 4 is a schematic diagram of the working principle of an apparatus for scheduled, real-time, or on-demand monitoring of welding joints according to Embodiment 4 of the present invention.

In FIG. 4, T is an ultrasonic actuator, R is an ultrasonic receiver, and P1 and P2 are two structures welded together through a butt joint. Actuator T is mounted on structure P1 and receiver R is mounted on structure P2.

The following is the working principle of the apparatus for scheduled, real-time, or on-demand monitoring of welding joints provided by the embodiment. The control unit controls the actuator T to emit ultrasonic signals. Some ultrasonic signals are transmitted through the welding joint. The ultrasonic signals transmitted through are received by the receiver R. The received signals when the welding joint is defective are different from those when the welding joint is normal. The signal processing unit determines if the welding joint is defective by analyzing the received signals.

There are many methods to determine if a welding joint is defective. One method uses comparison with baseline signals. Specifically, the received signal when the welding joint is normal is used as the baseline signal. When the welding joint is defective, the received signal deviates from the baseline signal. If the deviation reaches certain threshold, the welding joint is considered defective. Otherwise, the welding joint is considered normal.

The apparatus for scheduled, real-time, or on-demand monitoring of welding joints provided by this embodiment may further include a temperature sensor. At different temperatures, the received signals can be different. In order to compensate for the differences caused by the temperature, a temperature sensor is used to collect the temperature data of the structure at the welding joint in real time. When analyzing the received signal, the signal processing unit performs temperature compensation based on the temperature data of the welding joint, to compensate for the differences caused by the temperature.

The apparatus for scheduled, real-time, or on-demand monitoring of welding joints provided by this embodiment may further include a strain sensor. The strain sensor is used to collect the strain data of the welding joint. The signal processing unit uses the strain data to help determine the status of the welding joint and improve the accuracy of the determination.

In embodiment 5, the apparatus for scheduled, real-time, or on-demand monitoring of welding joints includes an actuator T, a first receiver R1, a second receiver R2, a signal processing unit and a control unit. The signal processing unit can be a single chip microcomputer. The control unit can be an FPGA, a DSP chip or a single chip microcomputer. The signal processing unit can also be integrated with the control unit on a single chip microcomputer or FPGA.

Figure 5:
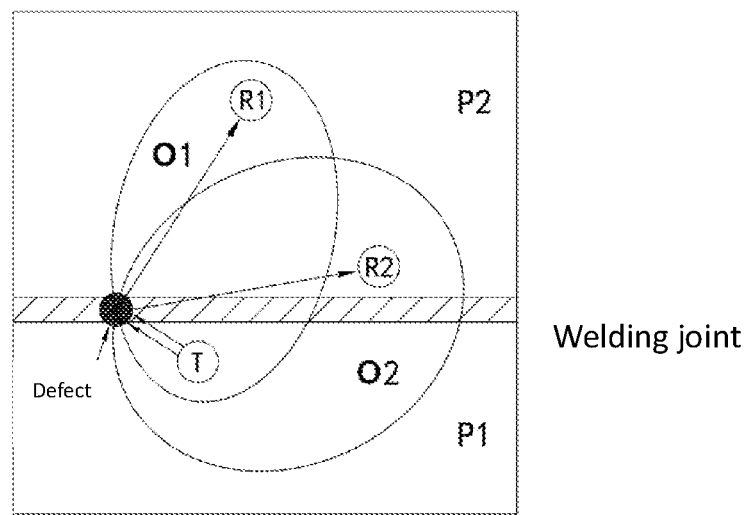
FIG. 5 is a schematic diagram of the working principle of an apparatus for scheduled, real-time, or on-demand monitoring of welding joints according to Embodiment 5 of the present invention.

In FIG. 5, T is an ultrasonic actuator, R1 is a first ultrasonic receiver, R2 is a second ultrasonic receiver, and P1 and P2 are two structures welded together through a butt joint. Actuator T is mounted on structure P1 and receiver R1 and receiver R2 are mounted on structure P2.

The following is the working principle of the apparatus for scheduled, real-time, or on-demand monitoring of welding joints provided by the embodiment. The control unit controls actuator T to emit ultrasonic signals. Some ultrasonic signals are transmitted through the welding joint. The signals transmitted through are received by receiver R1 and R2. The received signals when the welding joint is defective are different from those when the welding joint is normal. The signal processing unit determine if the welding joint is defective by analyzing the received.

There are many methods to determine if a welding joint is defective. One method uses comparison with baseline signals. Specifically, the received signal when the welding joint is normal is used as the baseline signal. When the welding joint is defective, the received signal deviates from the baseline signal. The difference between the received signal and the baseline signal is considered to be caused by the defect and treated as the signal transmitted through the defect. If the deviation reaches certain threshold, the welding joint is considered defective. Otherwise, the welding joint is considered normal.

In this embodiment, the position of the defect can be determined. The time that the signal transmitted through the defect reaches R1 and the time that the signal transmitted through the defect reaches R2 can be used to determine the position of the defect. Assume that the time that the signal reaches R1 is t1, and the propagation velocities of the ultrasonic wave in structure P1 and P2 are the same, with a value of v. Ignoring the transmission time of the ultrasonic wave inside the joint, the total distance of the ultrasonic wave travels from T to the defect and transmits through to R1 is t1*v. The set of points with sum of distances to T (the position of actuator T) and R1 (the position of receiver R1) equal to t1*v form an ellipse O1 with foci T and R1. Ellipse O1 and the joint line have at most two intersections and either may be the position of the defect. The position of the defect cannot be uniquely determined. If a second receiver R2 is added, the two intersections of ellipse O2 and the joint line can be found similarly. The position of the defect can be uniquely identified by selecting one point from each of the two intersections, where the distance between the two selected points are the shortest. The midpoint of the two selected points can be considered the position of the defect.

The severity of the defect can be determined using the energy of the signals transmitted through the defect or using other methods. For example, it can be determined based on the assumption that the larger the defect is, the greater the energy of the signals transmitted through the defect. Or it can be determined based on the assumption that the energy difference between the received signals when the welding joint is defective and those when the welding joint is normal is proportional to the size of the defect.

The apparatus for scheduled, real-time, or on-demand monitoring of welding joints provided by this embodiment may further include a temperature sensor. At different temperatures, the received signals can be different. In order to compensate for the differences caused by the temperature, a temperature sensor is used to collect the temperature data of the structure at the welding joint in real time. When analyzing the received signal, the signal processing unit performs temperature compensation based on the temperature data of the welding joint, to compensate for the differences caused by the temperature.

The apparatus for scheduled, real-time, or on-demand monitoring of welding joints provided by this embodiment may further include a strain sensor. The strain sensor is used to collect the strain data of the welding joint. The signal processing unit uses the strain data to help determine the status of the welding joint and improve the accuracy of the determination.

In embodiment 6, the apparatus for scheduled, real-time, or on-demand monitoring of welding joints includes a first ultrasonic actuator T1, a second ultrasonic actuator T2, an ultrasonic receiver R, a signal processing unit and a control unit. The signal processing unit can be a single chip microcomputer. The control unit can be an FPGA, a DSP chip or a single chip microcomputer. The signal processing unit can also be integrated with the control unit on a single chip microcomputer or FPGA.

In this embodiment, T1 is a first ultrasonic actuator, T2 is a second ultrasonic actuator, R is an ultrasonic receiver, and P1 and P2 are two structures welded together through a butt joint. Actuator T1 and T2 are mounted on structure P1 and receiver R are mounted on structure P2.

The following is the working principle of the apparatus for scheduled, real-time, or on-demand monitoring of welding joints provided by this embodiment. The control unit controls actuator T1 and actuator T2 to emit ultrasonic signals. Some ultrasonic signals are transmitted through the welding joint. The signals transmitted through are received by receiver R. The received signals when the welding joint is defective is different from those when the welding joint is normal. The signal processing unit determines if the welding joint is defective by analyzing the received signals.

There are many methods to determine if a welding joint is defective. One method uses comparison with baseline signals. Specifically, the received signal when the welding joint is normal is used as the baseline signal. When the welding joint is defective, the received signal deviates from the baseline signal. The difference between the received signal and the baseline signal is considered to be caused by the defect and treated as the signal transmitted through the defect. If the deviation reaches certain threshold, the welding joint is considered defective. Otherwise, the welding joint is considered normal.

In this embodiment, the position of the defect can be determined. The time that the signal emitted from T1 and transmitted through the defect reaches R and the time that the signal emitted from T2 and transmitted through the defect reaches R2 can be used to determine the position of the defect. Assume that the time that the signal emitted from T1 reaches R is t1, and the propagation velocities of the ultrasonic wave in structure P1 and P2 are the same with a value of v. Ignoring the transmission time of the ultrasonic wave inside the joint, the total distance of the ultrasonic wave travels from T1 to the defect and transmitted through to R is t1*v. The set of points with sum of distances to T1 (the position of actuator T1) and R (the position of receiver R) equal to t1*v form an ellipse O1 with foci T1 and R. Ellipse O1 and the joint line have at most two intersections and either may be the position of the defect. The position of the defect cannot be uniquely determined. If a second actuator T2 is added, the two intersections of ellipse O2 and the joint line can be found similarly. The position of the defect can be uniquely identified by selecting one point from each of the two intersections, where the distance between the two selected points are the shortest. The midpoint of the two selected points can be considered the position of the defect.

The severity of the defect can be determined using the energy of the signals transmitted through the defect or using other methods. For example, it can be determined based on the assumption that the larger the defect is, the greater the energy of the signals transmitted through the defect. Or it can be determined based on the assumption that the energy difference between the received signals when the welding joint is defective and those when the welding joint is normal is proportional to the size of the defect.

The apparatus for scheduled, real-time, or on-demand monitoring of welding joints provided by this embodiment may further include a temperature sensor. At different temperatures, the received signals can be different. In order to compensate for the differences caused by the temperature, a temperature sensor is used to collect the temperature data of the structure at the welding joint in real time. When analyzing the received signal, the signal processing unit performs temperature compensation based on the temperature data of the welding joint, to compensate for the differences caused by the temperature.

The apparatus for scheduled, real-time, or on-demand monitoring of welding joints provided by this embodiment may further include a strain sensor. The strain sensor is used to collect the strain data of the welding joint. The signal processing unit uses the strain data to help determine the status of the welding joint and improve the accuracy of the determination.

In embodiment 7, the actuators and the receivers are mounted on different structures such that the signals transmitting through the welding joint are used for monitoring. The actuators are enclosed in one housing. Each receiver is enclosed in one separate housing. The wires of each receiver are connected to the housing of the actuators via a cable. The wires of each receiver, together with the wires of the actuators, are connected to the control unit via a cable.

In this embodiment, the apparatus for scheduled, real-time, or on-demand monitoring of welding joints includes an actuator T, a first receiver R1, a second receiver R2, a signal processing unit and a control unit. The signal processing unit can be a single chip microcomputer. The control unit can be an FPGA, a DSP chip or a single chip microcomputer. The signal processing unit can also be integrated with the control unit on a single chip microcomputer or FPGA.

Figure 6:
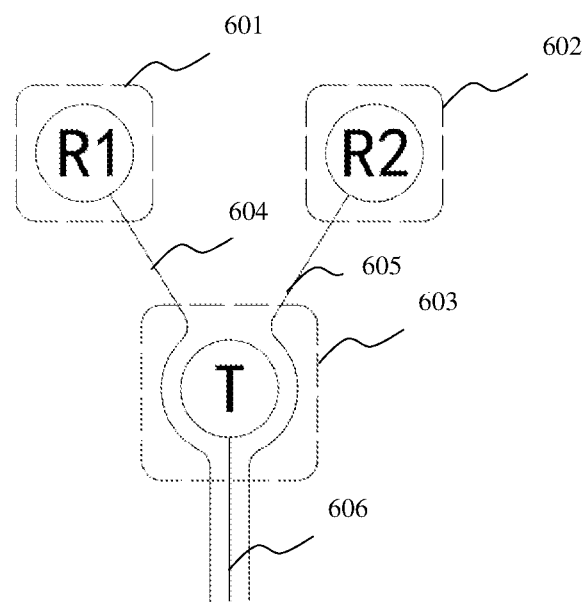
FIG. 6 is a schematic representation of the structure of an apparatus for scheduled, real-time, or on-demand monitoring of welding joints according to Embodiment 7.

In FIG. 6, T is an ultrasonic actuator, R1 is a first ultrasonic receiver, and R2 is a second ultrasonic receiver. Actuator T is mounted on one side of the welding joint and receiver R1 and receiver R2 are mounted on the other side.

As shown in FIG. 6, actuator T is enclosed in one housing 601, receiver R1 is enclosed in another housing 602, and receiver R2 is enclosed in another housing 603. The wires 604 of R1 and the wires 605 of R2 pass through the housing of actuator T. The wires of both receivers and the wires 606 of the actuator are enclosed in one cable and connected to the control unit.

One important factor that hinders the practical applications of scheduled, real-time, or on-demand monitoring is the complicated connection cables. The advantage of the apparatus for scheduled, real-time, or on-demand monitoring of welding joints provided by this embodiment is that the number of cables required is significantly reduced.

In embodiment 8, the actuators and the receivers are mounted on different structures in, such that the signals transmitting through the welding joint are used for monitoring. The actuators are enclosed in one housing. Each receiver is enclosed in one separate housing. The wires of each receiver are connected to the housing of the actuators via a cable. The wires of each receiver, together with the wires of the actuators, are connected to the control unit via a cable.

In this embodiment, the apparatus for scheduled, real-time, or on-demand monitoring of welding joints includes an actuator T, a first receiver R1, a second receiver R2, a third receiver R3, a fourth receiver R4, a signal processing unit and a control unit. The signal processing unit can be a single chip microcomputer. The control unit can be an FPGA, a DSP chip or a single chip microcomputer. The signal processing unit can also be integrated with the control unit on a single chip microcomputer or FPGA.

Figure 7:
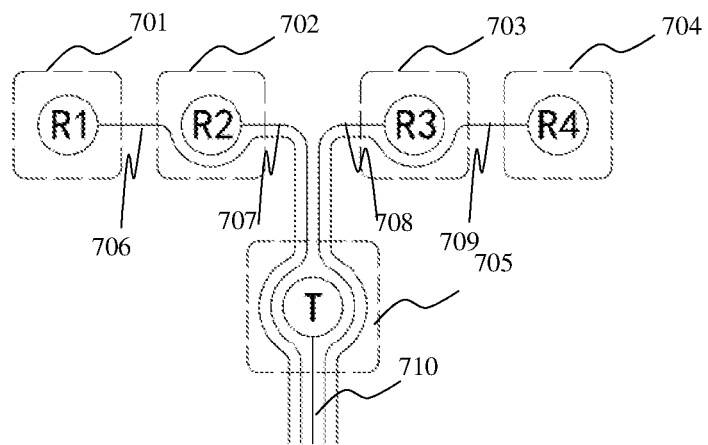
FIG. 7 is a schematic representation of the structure of an apparatus for scheduled, real-time, or on-demand monitoring of welding joints according to Embodiment 8.

In FIG. 7, T is an ultrasonic actuator, R1 is a first ultrasonic receiver, R2 is a second ultrasonic receiver, R3 is a third ultrasonic receiver, and R4 is a second ultrasonic receiver. Actuator T is mounted on one side of the welding joint, receiver R1, receiver R2, receiver R3, and receiver R4 are mounted on the other side.

As shown in FIG. 7, actuator T is enclosed in one housing 705, receiver R1 is enclosed in another housing 701, receiver R2 is enclosed in another housing 702, receiver R3 is enclosed in another housing 703, and receiver R4 is enclosed in another housing 704. The wires 706 of R1, the wires 707 of R2, the wires 708 of R3, and the wires 709 of R4 pass through the housing of actuator T. The wires of all receivers and the wires 710 of the actuator are enclosed in one cable and connected to the control unit. The wires of R1 passes through the housing of R2 and the wires of R4 passes through the housing of R3.

One important factor that hinders the practical applications of scheduled, real-time, or on-demand monitoring is the complicated connection cables. The advantage of the apparatus for scheduled, real-time, or on-demand monitoring of welding joints provided by this embodiment is that the number of cables required is significantly reduced.

In embodiment 9, when the actuators and the receivers are mounted on the same structure, the wiring can be further simplified. All or part of the actuators and the receivers are enclosed in one housing. The wires of each receiver, together with the wires of the actuators, are connected to the control unit via one cable.

In this embodiment, the apparatus for scheduled, real-time, or on-demand monitoring of welding joints includes an actuator T, a first receiver R1, a second receiver R2, a signal processing unit and a control unit. The signal processing unit can be a single chip microcomputer. The control unit can be an FPGA, a DSP chip or a single chip microcomputer. The signal processing unit can also be integrated with the control unit on a single chip microcomputer or FPGA.

Figure 8:
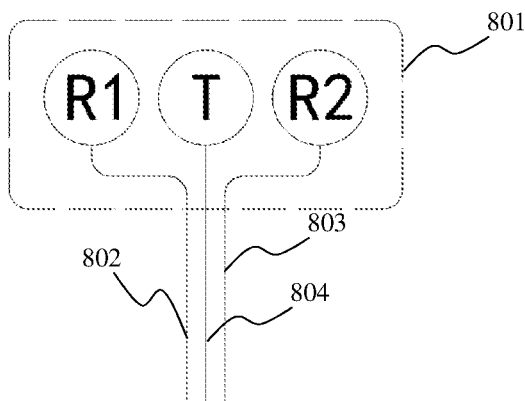
FIG. 8 is a schematic representation of the structure of an apparatus for scheduled, real-time, or on-demand monitoring of welding joints according to Embodiment 9.

In FIG. 8, T is an ultrasonic actuator, R1 is a first ultrasonic receiver, and R2 is a second ultrasonic receiver. Actuator T, receiver R1, and receiver R2 are mounted on the same side of the welding joint.

As shown in FIG. 8, actuator T, receiver R1, and receiver R2 are enclosed in one housing 801. The wires (802 and 803) of both receivers and the wires 804 of the actuator are enclosed in one cable and connected to the control unit.

One important factor that hinders the practical applications of scheduled, real-time, or on-demand monitoring is the complicated connection cables. The advantage of the apparatus for scheduled, real-time, or on-demand monitoring of welding joints provided by this embodiment is that the number of cables required is significantly reduced.

In embodiment 10, when the actuators and the receivers are mounted on the same structure, the wiring can be further simplified. All or part of the actuators and the receivers are enclosed in one housing. The wires of each receiver, together with the wires of the actuators, are connected to the control unit via one cable.

In this embodiment, the apparatus for scheduled, real-time, or on-demand monitoring of welding joints includes an actuator T, a first receiver R1, a second receiver R2, a third receiver R3, a fourth receiver R4, a signal processing unit and a control unit. The signal processing unit can be a single chip microcomputer. The control unit can be an FPGA, a DSP chip or a single chip microcomputer. The signal processing unit can also be integrated with the control unit on a single chip microcomputer or FPGA.

Figure 9:
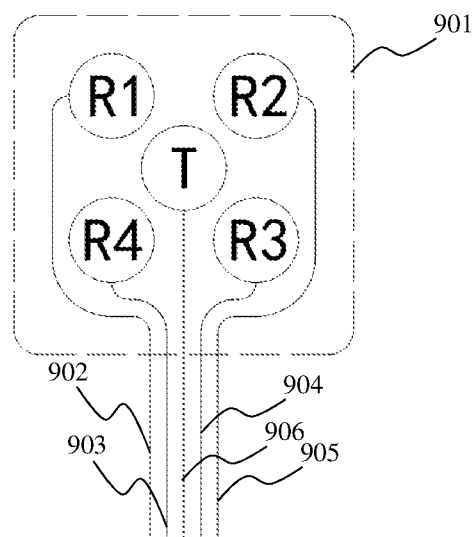
FIG. 9 is a schematic representation of the structure of an apparatus for scheduled, real-time, or on-demand monitoring of welding joints according to Embodiment 10.

In FIG. 9, T is an ultrasonic actuator, R1 is a first ultrasonic receiver, R2 is a second ultrasonic receiver, R3 is a third ultrasonic receiver, and R4 is a second ultrasonic receiver. Actuator T, receiver R1, receiver R2, receiver R3, and receiver R4 are mounted on the same side of the welding joint.

As shown in FIG. 9, actuator T, receiver R1, receiver R2, receiver R3, and receiver R4 are all enclosed in one housing 901. The wires (902, 903, 904, and 905) of all receivers and the wires 906 of the actuator are enclosed in one cable and connected to the control unit.

One important factor that hinders the practical applications of scheduled, real-time, or on-demand monitoring is the complicated connection cables. The advantage of the apparatus for scheduled, real-time, or on-demand monitoring of welding joints provided by this embodiment is that the number of cables required is significantly reduced.

The invention has the following advantages: it enables monitoring of the status of the welding joint, tracking of the occurrence and expansion of the welding defect, and determining the position and severity of the defect in real time while the equipment is in service. The invention can optimize the maintenance efficiency, change the periodical inspection to automatic and real-time monitoring, and effectively prevent disaster accidents.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. An apparatus for monitoring of a welding joint, comprising:
    an ultrasonic actuator at an actuator position;
    a first ultrasonic receiver at a first position and a second ultrasonic receiver at a second position, wherein the ultrasonic actuator and the first and second ultrasonic receivers are mounted around the welding joint as in-situ sensors to allow scheduled, real-time, or on-demand monitoring of the welding joint;
    a control unit for controlling the ultrasonic actuator to emit and the first and second ultrasonic receivers to receive ultrasonic signals; and
    a signal processing unit for determining a position of a defect of the welding joint according to first baseline data, second baseline data, and ultrasonic signals reflected from or transmitted through the welding joint, wherein the ultrasonic signals reflected from or transmitted through the welding joint include first sensor data received by the first ultrasonic receiver and second sensor data received by the second ultrasonic receiver, and determining the position of the comprising:
        determining a first defect signal based on the first baseline data and the first sensor data, the first defect signal passing through the defect;
        calculating a first distance that the first defect signal travels from the ultrasonic actuator to the first ultrasonic receiver;
        determining a second defect signal based on the second baseline data and the second sensor data, the second defect signal passing through the defect;
        calculating a second distance that the second defect signal travels from the ultrasonic actuator to the second ultrasonic receiver;
        using the first distance, the first position, and the actuator position to form a first ellipse, the first position and the actuator position being foci of the first ellipse;
        using the second distance, the second position, and the actuator position to form a second ellipse, the second position and the actuator position being foci of the second ellipse;
        determining a plurality of intersection points between the first ellipse and the welding joint and between the second ellipse and the welding joint, respectively;
        determining a shortest distance between an intersection point on the first ellipse and an intersection point on the second ellipse; and
        determining the position of the defect based on a midpoint of a path of the shortest distance.

2. The apparatus of claim 1, wherein the ultrasonic actuator and at least one of the first and second ultrasonic receivers are mounted on a same side of the welding joint.

3. The apparatus of claim 1, wherein the ultrasonic actuator and at least one of the first and second ultrasonic receivers are mounted on different sides of the welding joint.

4. The apparatus of claim 1, wherein determining the first defect signal based on the first baseline data and the first sensor data includes using a difference between the first baseline data and the first sensor data.

5. The apparatus of claim 1, wherein the ultrasonic actuator is mounted on one side of the welding joint, at least one of the first and second ultrasonic receivers is mounted on another side of the welding joint, the ultrasonic actuator is enclosed in one housing, each of the first and second ultrasonic receivers is enclosed in a separate housing, wires of the ultrasonic actuator and wires of the at least one of the first and second ultrasonic receivers are enclosed in one cable connected to the control unit, and the wires of the at least one of the first and second ultrasonic receivers pass through the housing of the ultrasonic actuator.

6. The apparatus of claim 1, wherein the ultrasonic actuator is mounted on one side of the welding joint, at least one of the first and second ultrasonic receivers is mounted on another side of the welding joint, the ultrasonic actuator is enclosed in one housing, each of the first and second ultrasonic receivers is enclosed in a separate housing, wires of the ultrasonic actuator and wires of the first and second ultrasonic receivers are enclosed in one cable and connected to the control unit, and the wires of one of the first and second ultrasonic receivers pass through the housing of another one of the first and second ultrasonic receivers.

7. The apparatus of claim 1 further includes a temperature sensor to collect temperature of the welding joint, wherein the signal processing unit performs temperature compensation when determining the position of the defect.

8. The apparatus of claim 1 further includes a strain sensor to collect strain data of the welding joint, wherein the signal processing unit uses the strain data to help determine the position of the defect.

9. A method for scheduled, real-time, or on-demand monitoring of a welding joint, comprising:
    emitting ultrasonic signals at an actuator position and receiving ultrasonic signals reflected from or transmitted through the welding joint at a first position and a second position respectively, wherein the ultrasonic signals include first sensor data received at the first position and second sensor data received at the second position;

determining a first defect signal based on first baseline data and the first sensor data, the first defect signal passing through a defect of the welding joint;

calculating a first distance that the first defect signal travels from the actuator position to the first position;

determining a second defect signal based on second baseline data and the second sensor data, the second defect signal passing through the defect;

calculating a second distance that the second defect signal travels from the actuator position to the second position;

using the first distance, the first position, and the actuator position to form a first ellipse, the first position and the actuator position being foci of the first ellipse;

using the second distance, the second position, and the actuator position to form a second ellipse, the second position and the actuator position being foci of the second ellipse;

determining a plurality of intersection points between the first ellipse and the welding joint and between the second ellipse and the welding joint, respectively;

determining a shortest distance between an intersection point on the first ellipse and an intersection point on the second ellipse; and determining a position of the defect based on a midpoint of a path of the shortest distance.

10. The method according to claim 9, wherein the step of calculating the first distance includes calculating a propagation time of the first defect signal based on time when the first defect signal is emitted and received, and calculating the first distance based on the propagation time of the first defect signal.

11. The method according to claim 9, wherein determining the first defect signal based on the first baseline data and the first sensor data includes using a difference between the first baseline data and the first sensor data.

12. The method according to claim 10 further comprises determining a size of the defect based on energy of at least one of the first defect signal and the second defect signal.

13. The method of claim 9 further comprises collecting temperature data of the welding joint, wherein the step of determining the position of the defect includes using the temperature data when determining the position of the defect.

14. The method of claim 9 further comprises collecting strain data of the welding joint, wherein the step of determining the position of the defect includes using the strain data when determining the position of the defect.

15. The method according to claim 9, wherein the ultrasonic signals are emitted using a piezoelectric sensor.

16. The method according to claim 9, wherein the ultrasonic signals are received using at least one piezoelectric sensor.

17. An apparatus for monitoring of a welding joint, comprising:

an ultrasonic receiver at a receiver position;

a first ultrasonic actuator at a first position and a second ultrasonic actuator at a second position, wherein the ultrasonic receiver and the first and second ultrasonic actuators are mounted around the welding joint as in-situ sensors to allow scheduled, real-time, or on-demand monitoring of the welding joint;

a control unit for controlling the first and second ultrasonic actuators to emit and the ultrasonic receiver to receive ultrasonic signals; and a signal processing unit for determining a position of a defect of the welding joint according to first baseline data, second baseline data, and ultrasonic signals reflected from or transmitted through the welding joint, wherein the ultrasonic signals reflected from or transmitted through the welding joint include first emitter signals emitted from the first ultrasonic actuator and second emitter signals emitted from the second ultrasonic actuator, and determining the position of the defect comprising:

determining a first defect signal based on the first baseline data and the first emitter signals, the first defect signal passing through the defect;

calculating a first distance that the first defect signal travels from the first ultrasonic actuator to the ultrasonic receiver;

determining a second defect signal based on the second baseline data and the second emitter signals, the second defect signal passing through the defect;

calculating a second distance that the second defect signal travels from the second ultrasonic actuator to the ultrasonic receiver;

using the first distance, the first position, and the receiver position to form a first ellipse, the first position and the receiver position being foci of the first ellipse;

using the second distance, the second position, and the receiver position to form a second ellipse, the second position and the receiver position being foci of the second ellipse;

determining a plurality of intersection points between the first ellipse and the welding joint and between the second ellipse and the welding joint, respectively;

determining a shortest distance between an intersection point on the first ellipse and an intersection point on the second ellipse; and determining the position of the defect based on a midpoint of a path of the shortest distance.

* * * * *